UNITED STATES PATENT OFFICE.

PERRY FINLEY, OF NEW YORK, N. Y.

IMPROVEMENT IN THE PREPARATION AND TREATMENT OF INDIA RUBBER VARNISH.

Specification forming part of Letters Patent No. 146,387, dated January 13, 1874; application filed September 9, 1873.

*To all whom it may concern:*

Be it known that I, PERRY FINLEY, of the city, county, and State of New York, have invented certain Improvements in the Preparation and Treatment of India-Rubber Varnish, of which the following is a specification:

This invention consists in reducing india-rubber combined with sulphur to the condition of a varnish, and in producing hard coatings of the same upon the surfaces of articles of manufacture.

The undue enlargement in volume and the gelatinous properties of india-rubber when in a dissolved state have been heretofore formidable obstacles in the way of its successful employment as a varnish.

In the present invention, india-rubber, previous to its treatment with solvents, is submitted to a preparatory baking or heating for the purpose of depriving it of these properties. This change or conversion of india-rubber by heat is effected by either of the following methods:

First, take, say, one hundred pounds of india-rubber; cut it in thin slices or in small pieces; spread it upon pans or sheets of metal; and place it in an oven or other heater, and submit it to a high degree of heat, which should not be less than 138° nor more than 160° centigrade, (280°, 320° Fahrenheit,) for from seven to ten hours, or until the required change is effected.

Second, take the same quantity of rubber as above; cut in thin slices; place it in a closed vessel surrounded by a steam-jacket, and provided with masticating or grinding apparatus; masticate or grind the rubber from three to ten hours, maintaining it the while at a heat of about 160° centigrade, (320° Fahrenheit.)

Third, add from five to fifteen gallons of either flaxseed, castor, or cotton-seed oil to the above quantity of rubber, and treat substantially as in either of the above methods, or heat at a sufficiently high degree of heat to dissolve the rubber in the oil.

India-rubber, while undergoing this preparatory heating, emits a crackling sound; is covered with minute transparent blisters; contracts slightly in volume; acquires gradually a dark-brown color and a fused and enameled appearance on the surface; becomes plastic, and, while hot, may be kneaded like dough. The result of this baking or preparatory heating is a new product of rubber, differing widely in its property of solubility from raw or unheated gum, requiring from four to sixteen times less solvent for its reduction to a mobile liquid than is requisite for the reduction of raw rubber to the same condition, and, when treated with some solvent of india-rubber, will pass into a mobile varnish, free from the gelatinous quality of dissolved raw or unheated gum, and will present the appearance of a light or transparent varnish, and may be applied, in all respects, by the same means as copal or other varnishes.

For convenience of description, I shall apply to this baked or converted rubber the not wholly arbitrary term "dehydrated" india-rubber, and to the same when reduced with some solvent to a liquid, dehydrated india-rubber varnish.

The second part of this invention relates to the preparation of a varnish from this baked or dehydrated rubber and sulphur.

For this purpose, take, say, one hundred pounds of dehydrated rubber and from twenty-five to one hundred gallons of benzine or turpentine, and masticate or triturate in a pug-mill or other vessel provided with masticating or triturating apparatus until the rubber is thoroughly dissolved and reduced to the condition of a mobile liquid; then draw off and strain carefully to remove all dirt or undigested rubber, and mix with the varnish, by grinding through a paint-mill or otherwise, from twenty-five to forty pounds of flowers of sulphur. I vary the proportional quantity of sulphur, for different uses, from five to fifty pounds. The quantity yielding the best practical result for many purposes is from twenty-five to thirty-one pounds of sulphur to one hundred pounds of rubber.

The best solvents of india-rubber for practical purposes on a large scale are either petroleum, (or coal-tar,) naphtha, turpentine, and carbon-disulphide.

The above embraces a description of the process of converting india-rubber into a varnish as practiced in this invention, and is substantially the same as that described in the specification of Letters Patent granted to me on August 10, 1869, excepting the preparatory heating or baking herein set forth.

I also produce this dehydrated india-rubber varnish by subjecting india-rubber to a high degree of heat in some solvent of the same. For this purpose, I reduce india-rubber to the condition of a thick liquid in turpentine or other solvent, and subject it, in a still or otherwise, to a heat of not less than 138° nor more than 160° centigrade, (280°, 320° Fahrenheit,) for from one to five hours, or till the required conversion or reduction is effected, which will be indicated by the thick gelatinous fluid passing into a thin mobile liquid, almost as thin as water, if the process be carefully conducted. When the change is effected, distill off the excess of solvent till the whole acquires the consistency of a varnish; then combine with the same the required quantity of sulphur.

The third part of this invention relates to the application of this dehydrated india-rubber varnish, alone or combined with suitable colors, or other materials to be hereafter described, as a coating upon articles of manufacture, and the vulcanizing or hardening the same by the application of a high degree of heat. For this purpose cover the articles of manufacture to be coated with this varnish to the required thickness, by the application of one or more coats, and then subject the same to a high degree of heat in an oven, or other heater, which should not be less than 127° nor more than 160° centigrade, (260° to 320° Fahrenheit,) for from one to seven hours, or until the varnish is converted into a hard rubber coating.

I employ at present, in practice, a graduated heat. The varnished articles are placed in a heater, or vulcanizer, the steam or heat turned on, and allowed to rise gradually, so that the thermometer attached shall mark the first hour 111°, the second hour 120°, the third 138°, the fourth, to and including the sixth, not less than 138° nor more than 160° centigrade, (231°, 248°, 280°, 320° Fahrenheit.) The time of exposure to the heat in this case is six hours, when the heat is cut off and the articles allowed to remain till the oven cools. This is the vulcanizing process, and the product is a hard rubber coating, tough, enduring, resistant to all natural chemical agents, and highly ornamental. Although this new product is dependent upon the use of india-rubber and sulphur, and a sufficiently high degree of heat to induce the change indicated, the product may be considerably modified by the use of oxidizing agents in combination with heat in the vulcanizing process. This process consists in subjecting the varnish, after its application as a coating upon articles of manufacture, to the combined action of a high degree of heat and to the fumes of sulphur. Take for this purpose a tight oven, or vulcanizer, scatter some flowers of sulphur upon the bottom, say from one to five ounces to the cubic yard of space in the oven, place the varnished articles of manufacture in the oven, and subject to a vulcanizing heat, as before, till the coating is vulcanized or hardened; or heat the sulphur separately in a retort or flask, or otherwise, and induct the sulphur fumes into the vulcanizer during the time the baking or vulcanizing process is going forward. The result of this oxidation by the sulphur vapors is an improved product, the vulcanization is more perfect, the coating acquires an exceedingly brilliant and lustrous polish, and an intense black or jet color, even when there has been neither color nor sulphur introduced into the varnish. I also find that the Goodyear hard-rubber compound in bulk, when vulcanized in open heat, is improved in the intensity of black and in toughness of texture by this process.

The rationale of this process is, in the first place, the fumes of sulphur to which the coating or compound is submitted prevent the escape of the sulphur from the rubber by sublimation before it has accomplished its vulcanizing effect upon the coating or compound; second, the fumes of sulphur act as a kind of vulcanizing or sulphuring bath.

A variety of shades of color are produced by combining with this varnish oxidizable substances, such as the oxides of metals, or the metals in a fine state of division, and subjecting, as above, to the fumes of sulphur, or bromine, iodine, or to nitrous gas, or to chlorine.

This rubber varnish may be employed as a water-proof on muslin or other fabrics, on leather, or as a paint or varnish, and allowed to dry in the air, or by the sun's rays, where a protective coating is required without much hardness; but to produce a better drying varnish, I submit this dehydrated india-rubber varnish in bulk to the combined action of heat and oxidizing agents, such as sulphur or sulphur vapors, oxide or monoxide of lead, zinc sulphate, iron sulphate, or lead acetate. Take for this purpose, say, ten gallons of varnish without sulphur, of the strength of two pounds of rubber to the gallon, place it in a can or other vessel, and heat it, preferably with steam, for from two to seven hours at a heat of from 138° to 160° centigrade, (280° to 320° Fahrenheit;) sprinkle in the varnish, by a small quantity at a time, while the rubber is heating, from two to six pounds of sulphur.

I also employ either of the following oxidizing agents, as above, either alone or in combination with sulphur, in the proportion of from one-half to three-quarters of a pound of oxide or monoxide of lead, zinc sulphate, lead acetate, iron sulphate. I apply this oxidized varnish either with or without vulcanizing.

For the purpose of utility or economy, I produce a variety of modified products of this varnish by combining with it other materials, such as the resins, copal, lac, anime, or colophony, or oils, such as flaxseed, cotton-seed, or castor. To produce this part of the invention, I reduce gum-copal or anime by the commonly-practiced processes to a varnish, or I take the copal varnish of commerce, and combine it with the rubber varnish by mixing and heating them together; or I take, say, twenty pounds of india-rubber and from five to thirty pounds of copal, and heat in separate vessels, the rubber at a heat of about 170° centigrade, (341° Fahrenheit,) or to the fusing-point of rubber, and the copal to the fusing-point, and combine the two while in a melted condition, and thin with turpentine or other solvent or oil to reduce it to the consistency of a varnish. I combine either lac or colophony by heating these materials in combination with the rubber varnish until the lac or colophony dissolves or melts, and forms with the varnish a homogeneous varnish or fluid; or I combine the same by first dissolving the lac or colophony in heated turpentine, and then mixing with the rubber varnish. The oils are best combined by heating with the varnish for from two to ten hours at a heat of about 160° centigrade, or it may be united by simply adding the oil to the varnish. I employ these materials alone, or one or more combined, and in proportions varying from ten to one hundred parts to one hundred parts of india-rubber. I also employ in this connection either bitumen or coal-tar. The bitumen I treat in all respects as lac. The coal-tar I prefer to subject to a preparatory treatment before combining it with the rubber varnish for the purpose of depriving it of phenol or other acids. I take for this purpose crude coal-tar and agitate it for some time in a mixture of slaked lime and water, or a hot strong solution of caustic potash, and after letting it stand for some time I draw off the alkaline solution with a siphon, and then wash thoroughly in hot water; or I treat it for the same purpose with either sulphuric or nitric acids, and wash first in alkaline, and then in pure water. I combine this prepared tar with the varnish in the proportion of from one pint to one gallon of rubber varnish. The combination will be more readily effected if coal-tar, benzine, or benzole be employed as the solvent of the india-rubber. I also employ gutta-percha alone or with some drying-oil by heating the gutta-percha with the tar, or tar and flaxseed or other oil, till the whole is converted into a homogeneous fluid, which I thin in oil or in some solvent of rubber to the consistency of varnish, and add the required proportion of sulphur. This makes a cheap product, and is useful for some purposes.

For suitable colors, I employ, for red, vermilion, crocus, (red oxide of iron,) Indian red, arsenic-desulphide, oxide of antimony, scarlet-lake, crimson-lake; blue, about equal parts of ultramarine and oxide of zinc or cobalt-blue; green, about equal parts of chrome-green and oxide of zinc; yellow, sulphide of cadmium, chrome-yellow, gold ocher, arsenious sulphide, Roman ocher; drab, oxide of zinc or white lead; buff, oxide of zinc and sulphide of cadmium; black, drop-black, lamp-black. A great variety of shades of these colors may be produced by varying the proportional quantities of sulphur in the varnish, many of the colors being produced most decidedly by leaving out the sulphur altogether.

For the purpose of producing a grained appearance, such as is produced by the natural grain of wood, or to produce a variegated or mottled appearance, such as is found in variegated marble, I prepare this dehydrated india-rubber varnish of a variety of colors by grinding in the same pigments differing in color. I then dip the article to be grained or mottled in the varnish, say in which vermilion has been ground, and allow it to drip for a few minutes, when I dip it in the varnish in which drop-black has been ground. By the mingling of the red and black colors in this process there is produced an appearance closely resembling the grain of rose-wood. By varying the colors and the time between the first and second dipping of the article of manufacture, and the mixing of oil or gutta-percha with one or the other of the varnishes in which the article is dipped, I produce grainings and mottlings of great variety and beauty. In this process the grained articles are subjected to the vulcanizing process.

To produce bronzed surfaces, I cover the articles to be bronzed with the dehydrated india-rubber varnish and subject it to a heat of about 160° centigrade for from two to four hours, or till the varnish is almost free from tackiness, and is sufficiently dry to receive the bronze-powder or leaf, when I remove the article from the oven and allow it to cool. I then spread the bronze-powder, Dutch leaf, or foil, upon the slightly-tacky surface of the varnish in the usual way of applying these materials. I then replace the article in the oven and complete the baking or vulcanizing process. Afterward I varnish the bronze over with rubber varnish, preferably free from sulphur, or with copal varnish, or the two combined, and then harden with heat. In some cases I varnish the bronze over before baking the last time, so that the process may be completed in one baking. The product of this process is an enduring and beautiful bronze.

For the purpose of ornamentation, I transfer ornamental designs or engravings printed upon paper or muslin by placing the material containing the printed or engraved design upon the varnished surface, while the varnish is still tacky, with the design upon the varnished surface, and pressing it down by means of a flexible rubber roll or otherwise, and removing the paper or muslin. The design in this way becomes transferred from the paper or muslin to the varnish. The design or engraving must be printed in colors which will stand the heat of baking, and is best printed in rubber varnish, or flax-seed oil, or the rubber varnish combined with oil. In this way elaborate and highly ornamental designs may be produced and baked or hardened in the rubber coating at a trifling cost.

I produce a felt or velvety surface by sifting either flock, finely-powdered and dry paperpulp, or other fibrous material reduced to a fine state of division, upon the varnished surfaces while in a tacky condition.

To produce a grinding or cutting surface, I incorporate with the varnish or sift upon the varnished article some gritty substance, such as corundum, emery, crocus, or sand. This will be valuable as a coating for roofs of houses, for iron buildings, and for general outdoor purposes where an enduring coating is required, and, when submitted to a vulcanizing heat, will form a grinding or cutting surface of great strength and endurance, and may be made of any degree of fineness by the employment of suitable gritty substances.

I also employ this dehydrated india-rubber varnish as a "rubber cement" for uniting the edges or seams of hard-rubber compounds, and for such other purposes as rubber cements are employed in the manufacture of hard rubber. The advantage in this over dissolved raw rubber, which is at present employed in rubber factories, is its more perfect fluidity and the more condensed form of the rubber in the varnish over the cement.

I claim as my invention—

1. The process of baking or dehydrating india-rubber by submitting it to a high degree of heat, to produce, in combination with some solvent of india-rubber and sulphur, a concentrated varnish free from the gelatinous property and enlarged volume common to dissolved, raw, or unheated rubber, substantially as and for the purpose set forth.

2. The compound or dehydrated india-rubber varnish, composed of baked or dehydrated india-rubber, sulphur, and benzine, or other solvent of india-rubber, substantially as and for the purpose set forth; and this I claim whether the said compound or varnish be or be not combined with other materials, such as set forth.

3. The process of oxidizing said varnish by subjecting it, either when applied as a coating or when in bulk, to the combined action of heat and oxidizing agents, such as the fumes of sulphur, nitrous gas, monoxide of lead, &c., for the purpose of improving the product of vulcanization, or to produce different shades of color, or to produce a self-drying varnish, substantially as and for the purpose set forth.

4. As a new product or article of manufacture, dehydrated or baked india-rubber, for the purposes described.

5. As a new article of manufacture, india-rubber varnish composed of dehydrated or baked india-rubber, sulphur, and some solvent of india-rubber, whether the same is combined with other materials or not, as set forth, and for the purposes set forth.

PERRY FINLEY.

Witnesses:
STEPHEN P. M. TASKER,
THOS. C. WARWICK.